US012775520B2

(12) United States Patent
Durham et al.

(10) Patent No.: US 12,775,520 B2
(45) **Date of Patent: *Oct. 27, 2026**

(54) SECURE ERROR CORRECTING CODE (ECC) TRUST EXECUTION ENVIRONMENT (TEE) CONFIGURATION METADATA ENCODING

(71) Applicant: Intel Corporation, Santa Clara, CA (US)

(72) Inventors: David M. Durham, Beaverton, OR (US); Sergej Deutsch, Hillsboro, OR (US); Karanvir Grewal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 164 days.

This patent is subject to a terminal disclaimer.

(21) Appl. No.: 18/676,811

(22) Filed: May 29, 2024

(65) Prior Publication Data

US 2024/0311234 A1 Sep. 19, 2024

Related U.S. Application Data

(63) Continuation of application No. 18/147,521, filed on Dec. 28, 2022.

(51) Int. Cl.
*G06F 11/10* (2006.01)
*H04L 9/08* (2006.01)

(52) U.S. Cl.
CPC ........ *G06F 11/1044* (2013.01); *H04L 9/0816* (2013.01)

(58) Field of Classification Search
CPC ........................... G06F 11/1044; H04L 9/0816
See application file for complete search history.

(56) References Cited

U.S. PATENT DOCUMENTS

2019/0319781 A1* 10/2019 Chhabra ............... G06F 3/0655

* cited by examiner

*Primary Examiner* — Mark D Featherstone

(74) *Attorney, Agent, or Firm* — Jaffery Watson Hamilton & DeSanctis LLP

(57) ABSTRACT

The technology disclosed herein includes a memory to store a plurality of pages, a page of the plurality of pages configured as one of a trusted execution environment (TEE) configuration and a non-TEE configuration, and a memory controller to attempt to access the page using a memory address and the TEE configuration and generate a first error correcting code (ECC); and when data for the first ECC is at least one of correct and correctable by ECC for the attempt to access the page using the TEE configuration, attempt to access the page using the memory address and the non-TEE configuration and generate a second ECC, and when data the second ECC is at least one of correct and correctable by ECC for the attempt to access the page using the non-TEE configuration, store the memory address as an unknown cacheline address.

20 Claims, 6 Drawing Sheets

SECURE ERROR CORRECTING CODE (ECC) TRUST EXECUTION ENVIRONMENT (TEE) CONFIGURATION METADATA ENCODING

CROSS-REFERENCE

The present patent application is a continuation of U.S. application Ser. No. 18/147,521, filed Dec. 28, 2022, and issued as U.S. Pat. No. 12,045,128 on Jul. 23, 2024, the contents of which are incorporated herein by reference in their entirety.

FIELD

Embodiments relate generally to accessing memory in a computing system, and more particularly, to improving performance, robustness and efficiency of reading and writing security configuration metadata in ECC memory in computing systems.

BACKGROUND

Error-correcting code (ECC) dynamic random-access memory (DRAM) modules provide additional storage for in-line ECC. For instance, a typical high reliability, availability, serviceability (RAS) 10×4 double data rate five (DDR5) dual inline memory module (DIMM) incorporates two ECC devices, allowing for storing of an additional 128 bits per cacheline (512b). These bits are read simultaneously, or in parallel, with the data, hence there is no impact on bandwidth or latency. Certain security technologies use a portion of that storage for in-line security metadata, effectively "stealing" bits from the error correcting code. For example, an implementation of a trusted execution environment (TEE), such as Trust Domain Extensions (TDX) by Intel Corporation, stores one bit (sometimes called a TEE bit) per cacheline in ECC memory to indicate whether this memory is being used within the TEE and for maintaining cryptographic separation between TEE domains. However, stealing any bits from ECC degrades ECC guarantees, and can eliminate some capabilities such as guaranteed single data device correction (SDDC). In some computing systems, the TEE bit can be replaced by a TEE pattern of multiple bits or different message authentication Galois integrity and correction (MAGIC) ECC (e.g., a combined ECC and integrity code) secret key. Autonomous entities within the computing system, such as a memory scrubber or Adaptive Double DRAM Device Correction, do not know which key to use when reading, correcting and rewriting memory, or whether a page in a memory is associated with a TEE.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope. The figures are not to scale. In general, the same reference numbers will be used throughout the drawings and accompanying written description to refer to the same or like parts.

DETAILED DESCRIPTION

Figure 1:
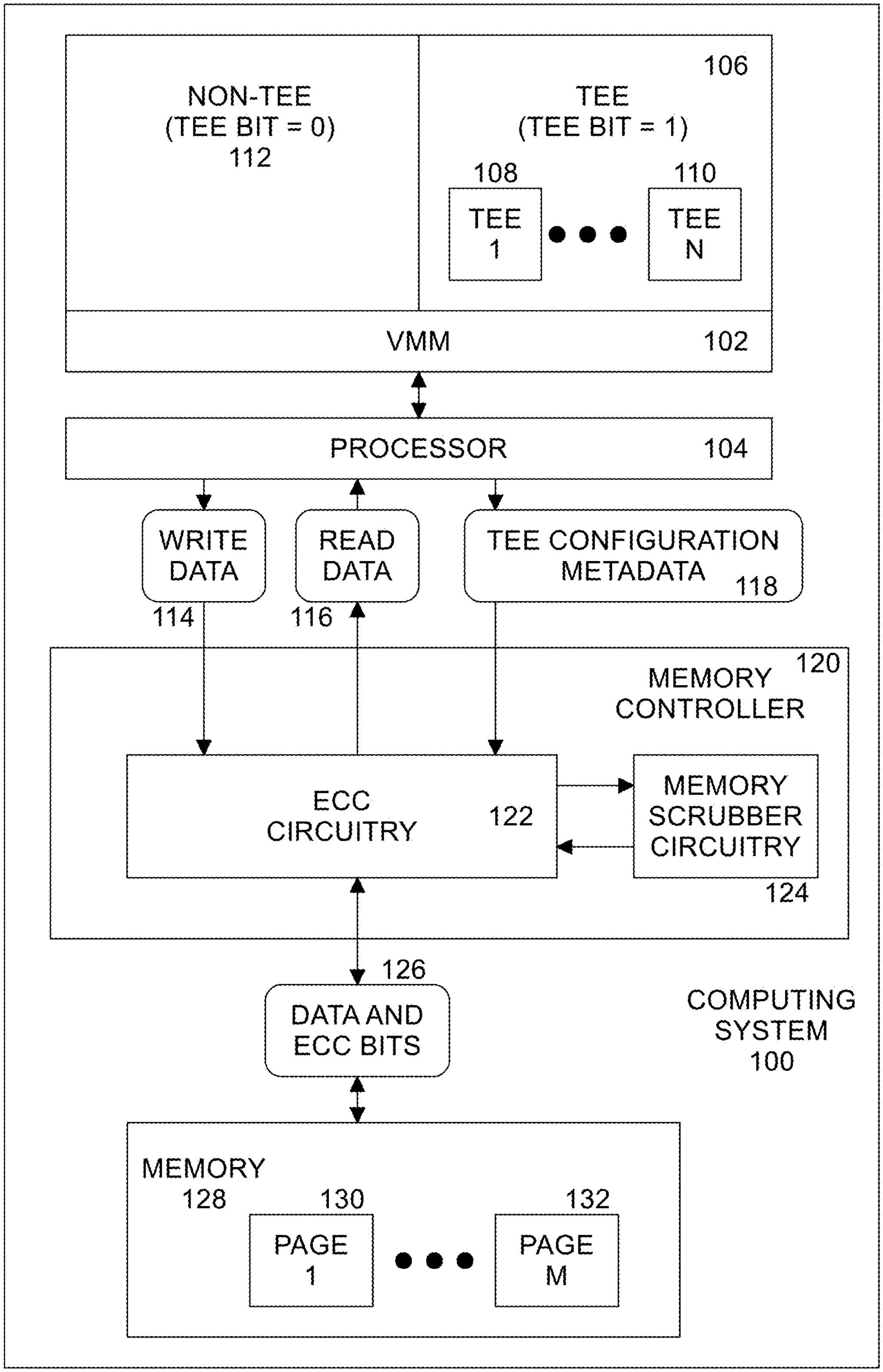
FIG. 1 illustrates a computing system providing secure ECC TEE configuration metadata encoding in an implementation.

Implementations of the disclosure provide efficient TEE configuration metadata encoding in ECC memory that reduces or eliminates negative impacts to reliability, availability and serviceability (RAS). In an implementation, autonomous entities within the computing system, such as memory scrubber circuitry, can discover or deduce the correct TEE state or non-TEE state for a cacheline of a memory while assuring single data device correction (SDDC).

The technology described herein may be implemented as part of the ECC circuitry. The granularity of a memory access for ECC correction is a cache line while the configuration of memory is page granular in terms of memory mappings, permissions and policies. In an implementation, instead of one ECC check, two ECC checks are performed, one for each possible TEE bit value (e.g., either 0 or 1), when the TEE configuration metadata is a TEE bit. Depending on both results, the original TEE bit value and the original data may be deduced (or whether the original data is corrupted and cannot be corrected may be determined). A processor provides the TEE configuration metadata on write operations, so the TEE configuration metadata (e.g., the TEE bit) can be encoded. On read operations, the TEE configuration metadata value from the processor is used as a hint to verify that the TEE configuration metadata matches with the TEE configuration metadata decoded from the data read from the memory. However, some autonomous entities, whether hardware or software, may not know the configuration of memory when performing a read operation.

The technology described herein is applicable to the types of security configuration metadata bits that are stored in memory (e.g., DRAM) on cacheline write requests and that are validated on each read request. For example, TDX stores one bit per cacheline, called a TD bit in TDX (but which will be referred to herein generally as a TEE bit), that is set if the cacheline is within the memory of a TEE domain. On read requests, the processor provides a request TEE bit, which is set if and only if the request originates from a TEE domain. The request TEE bit is then compared with the TEE bit retrieved from memory. If the bits don't match, that means non-TEE software is trying to read TEE memory or vice versa. Other, similar types of security configuration metadata handled in this manner may include TEE patterns of multiple bits, cryptographic key IDs, or memory tags in general, that are stored in memory on write requests and are validated on read requests.

Although described herein with respect to TDX, the technology described herein may also be implemented in other confidential computing architectures, such as Advanced Micro Devices, Inc. (AMD) Secure Encrypted Virtualization (SEV), ARM Realm Management Extension (RME), and ARM Confidential Computing Architecture (CCA).

As used herein, TEE configuration metadata may include a TEE bit, a TEE pattern of multiple bits, a MAGIC ECC secret key, a memory encryption key, or a fixed TEE symbol for a Reed Solomon code. In an implementation, TEE configuration metadata may be included in a physical address to access memory or additional metadata on a cacheline.

FIG. 1 illustrates a computing system 100 providing secure ECC TEE configuration metadata encoding in an implementation. Computing system 100 includes a virtual machine manager (VMM) 102 and a processor 104. VMM 102 supports operation of a TEE 106, which may include a plurality of TEE domains, shown here as TEE 1 108, . . . TEE N 110, where N is a natural number. Memory references to data stored in memory 128 include TEE configuration metadata 118 (e.g., a TEE bit, a TEE pattern, or a MAGIC ECC secret key). In an implementation, when TEE configuration metadata 118 is a TEE bit equal to 1 in a memory reference, the computing system 100 indicates that the reference is to TEE (e.g., protected) memory in memory 128. VMM 102 also supports operation of non-TEE processes 112. In an implementation, when TEE configuration metadata 118 is a TEE bit equal to 0 in a memory reference, the computing system 100 indicates that the reference is to non-TEE (e.g., non-protected) memory in memory 128.

Either a non-TEE process or a TEE domain (such as TEE 1 108, . . . TEE N 110) may store write data 114 into memory 128. Memory 128 is divided into a plurality of pages, shown in FIG. 1 as page 1 130, . . . page M 132, where M is a natural number. Write data 114 may be stored into one or more cachelines of one or more pages of memory 128. During performance of a write operation, ECC circuitry 122 of memory controller 120 generates ECC bits corresponding to write data 114 and stores the data and ECC bits 126 in memory 128. During performance of a read operation, ECC circuitry generates ECC bits from data retrieved from memory 128 and compares the newly generated ECC bits to ECC bits retrieved from memory corresponding to the data (which were previously stored during the write operation). If the ECC bits do not match, one or more errors have occurred and ECC circuitry 122 attempts to correct the one or more errors. If the data cannot be corrected, ECC may still detect that a detectable uncorrectable error (DUE) occurred. Read data 116 may then be returned to processor 104, for eventual communication to one of non-TEE process 112 or one or more TEE domains in TEE 106. In either case of a write operation or a read operation, processor 104 sends TEE configuration metadata 118 for the memory access operation to ECC circuitry 122 of memory controller 120.

Memory scrubbing consists of reading data from each location of memory 128, correcting bit errors (if any) with an ECC, and writing the corrected data back to the same location. Due to the high integration density of memory 128, the individual memory cell structures have become small enough to be vulnerable to cosmic rays and/or alpha particle emission. The information in a memory supporting ECC is stored redundantly enough to correct a single bit error per memory word. Hence, an ECC-equipped memory can support the "scrubbing" of the memory content. If a component of the memory controller 120, called a memory scrubber, scans systematically through the memory, single bit errors can be detected, the erroneous bit can be determined using the ECC checksum, and the corrected data can be written back to the memory. There are two variants of memory scrubbers, known as patrol scrubbers and demand scrubbers. Patrol scrubbers run in an automated manner when the computing system is idle, while demand scrubbers perform the error correction when the data is requested from memory.

In an implementation, memory controller 120 includes memory scrubber circuitry 124. In an implementation, memory scrubber circuitry 124 is a patrol scrubber. Memory scrubber circuitry 124 reads data from memory 128 using ECC circuitry 122, detects any single bit errors, corrects the errors, and writes the correct data back to memory 128 using ECC circuitry 122.

In an implementation, memory scrubber circuitry 124 attempts to access memory with a memory address including TEE configuration metadata (e.g., a TEE bit, a plurality of bits in a TEE pattern, or a MAGIC ECC key). In an implementation, a different key may be used for the trusted side (e.g., TEE domains) versus the untrusted side (e.g., VMM 102). If TEE configuration metadata from one side results in an error and the TEE configuration metadata from the other side does not result in an error, it can be assumed that this second TEE configuration metadata is the correct TEE configuration metadata. If both TEE configuration metadata result in errors or no errors, then ECC circuitry 122 checks the TEE configuration metadata on other (e.g., adjacent on the same physical memory page) cachelines on the same physical memory page to address the error ambiguities. ECC circuitry 122 should not attempt to write back corrected lines to memory 128 until the correct TEE configuration metadata is verified. ECC circuitry 122 tests multiple cachelines on the same physical page to determine if a cacheline is owned by a TEE domain (e.g., uses a TEE pattern) or is owned by a non-TEE process, even in the presence of memory errors.

When combined with MAGIC, different keys may be used for memory 128 for TEE domains and for memory for non-TEE processes using this method, thereby allowing memory scrubber circuitry 124 (or other autonomous entities within the computing system) to function autonomously without knowing the TEE ownership of a particular memory address.

ECC circuitry 122 triggers a detectable uncorrectable error (DUE) when encountering an error correction that is correct for both TEE configuration metadata (e.g., for TEE 106 and VMM 102). In this case an error is noted but memory 128 is not poisoned (that is, the memory contents are not corrected nor is a poison pattern set). ECC circuitry 122 then attempts to access adjacent cachelines of memory 128 with both TEE configuration metadata to attempt to discern which TEE configuration metadata is correct for a physical page of memory. For example, DUE would indicate a TEE configuration metadata mismatch, or in the case of a Reed-Solomon fixed symbol for the TEE configuration metadata, the fixed symbol identifying the TEE configuration of the memory line would be corrected to the correct TEE configuration metadata for that cacheline. Multiple cachelines belonging to the same physical memory page may be queried to verify that the TEE configuration metadata is the same for all cachelines.

When using memory encryption circuitry (such as multi-key total memory encryption (MKTME or TME-MK) technology available from Intel Corporation) in processor 104 and/or memory controller 120, each cacheline is tweaked with the physical memory address, meaning that the resulting ciphertext is different for each cacheline in a page. This property also assures that the same memory error won't be associated with the same data pattern, allowing multiple attempts to resolve the TEE configuration metadata of a page as it is very unlikely all lines will exhibit the dual TEE configuration metadata correction given the different input data, with most lines on a page identifying the single correct TEE configuration metadata for the page. Conversely, without using memory encryption circuitry (e.g., MKTME) there is the possibility that every cacheline for the same failed memory 128 will have the same data and therefore, with the same error profile, exhibit the same collision in TEE configuration metadata across the page. Thus, it may be useful to tweak the diffusion or cipher (as discussed below with respect to FIG. 4), in addition to the use of a secret key, using the address/cacheline location on the page to assure that the same TEE configuration metadata does not repeat for every cacheline in a physical memory page.

In an implementation, memory scrubber circuitry 124 (or other autonomous entity), through ECC circuitry 122, attempts to access a cacheline on a page of memory 128 using a TEE configuration metadata. In some implementations, ECC circuitry 122 and memory scrubber circuitry 124 are combined. If they are separate, the ECC circuitry accesses the physical memory 128 as directed by the memory scrubber circuitry. In this case, the memory scrubber circuitry accesses the ECC circuitry to attempt to access (but does not correct and write back) a line of memory with a given TEE configuration metadata, tries again with a different TEE configuration metadata, and then finally directs the ECC circuitry to correct and write back the memory line with the correct TEE configuration metadata.

If there is no error based on ECC circuitry 122 processing, the correct TEE configuration metadata was used for accessing the cacheline, and all other accesses to the same physical page will use the same TEE configuration metadata. Otherwise, ECC circuitry 122 attempts to access the page again using a non-TEE configuration metadata. If no error is detected by ECC circuitry 122, the ECC circuitry accesses the remainder of the page using the non-TEE configuration metadata. If both TEE configuration metadata are correctable by ECC circuitry, then a potential SDDC condition has occurred where the TEE configuration metadata state is ambiguous. To resolve which TEE configuration metadata is correct, the ECC circuitry accesses adjacent cachelines on the same page. If access to any cacheline on the same page reveals a TEE configuration metadata that does not return an error where the opposite configuration does return an error, that TEE configuration metadata may then be assumed for correct usage for accessing the entire page and the ECC circuitry 122 uses that TEE configuration metadata thereafter for accessing the page (since all cachelines on a page are accessed using the same TEE configuration metadata).

Figure 2A:
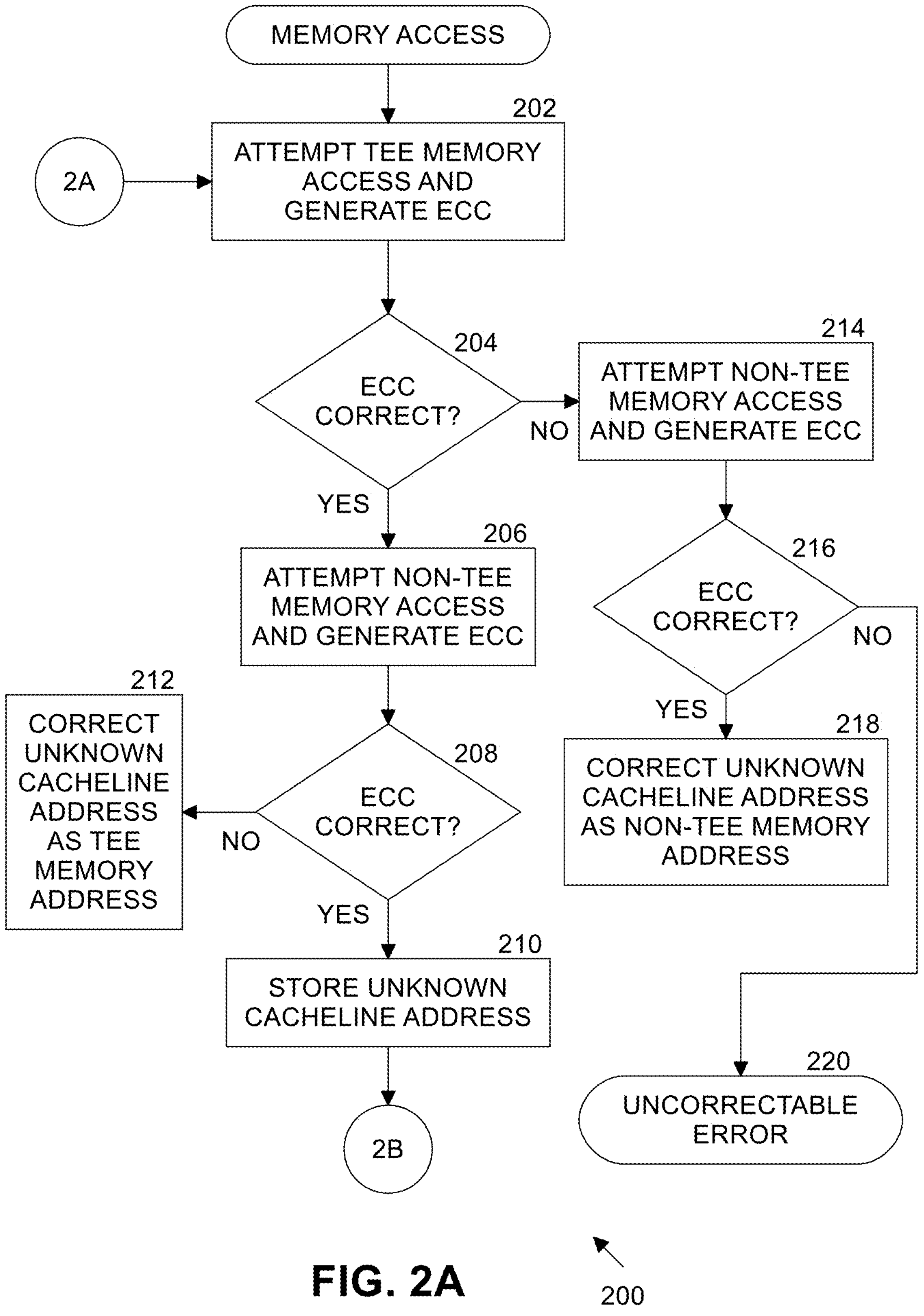
FIGS. 2A and 2B illustrate secure ECC TEE configuration metadata encoding processing in an implementation.
Figure 2B:
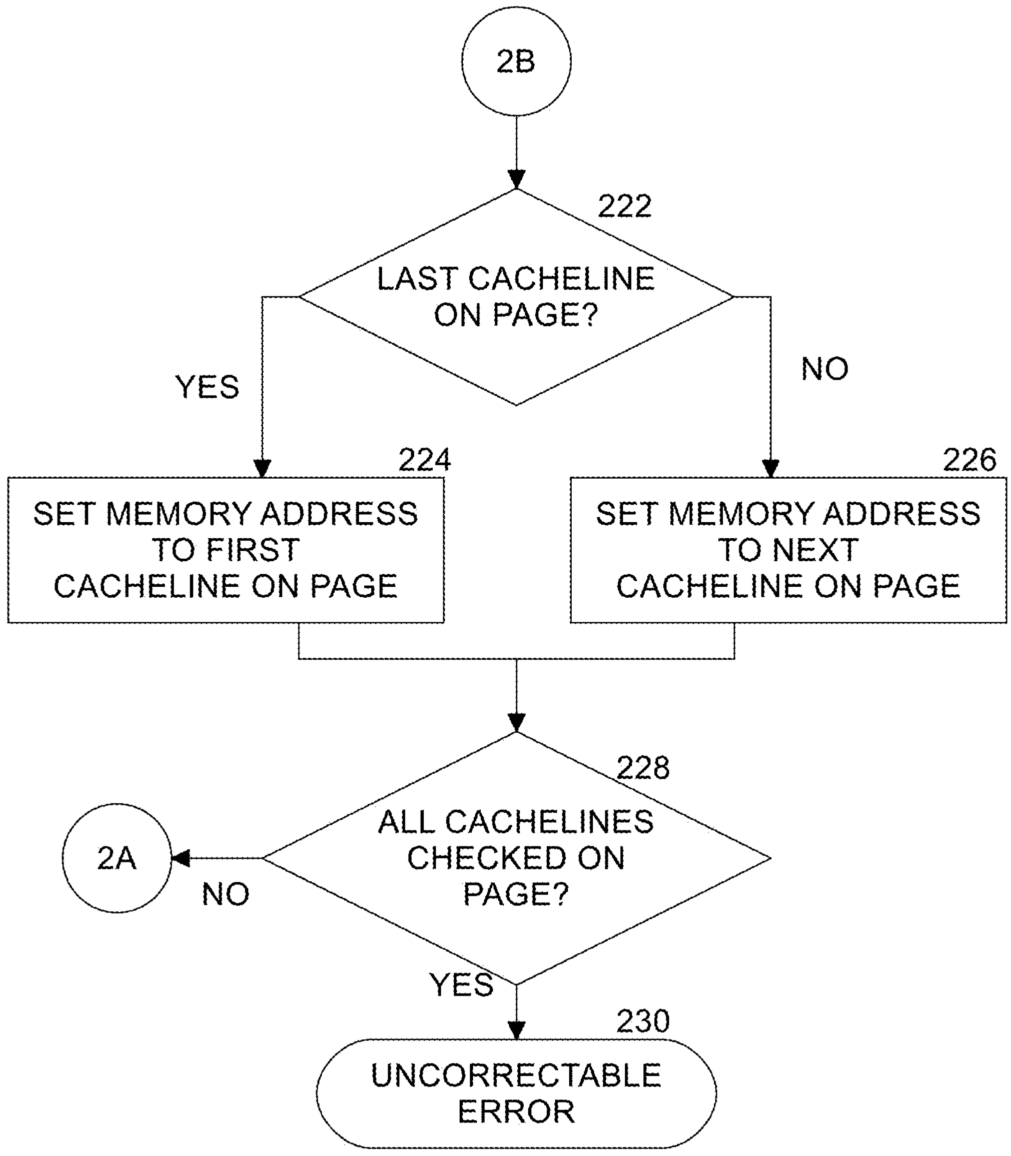

FIGS. 2A and 2B illustrate secure ECC TEE configuration metadata encoding processing 200 in an implementation. When a memory access is attempted by memory scrubber circuitry 124 (or other autonomous entity in computing system 100), the memory scrubber circuitry does not know whether the memory being accessed as part of the memory scrubbing operation is for a TEE domain 108 . . . 110 in TEE 106 or for a non-TEE process 112. At block 202, ECC circuitry 122 attempts an access of a page in memory 128 using a memory address, supplied by the memory scrubber circuitry, which contains embedded TEE configuration metadata. ECC circuitry 122 generates an ECC check for the attempted memory access using a presumptive TEE configuration metadata and data fetched from the memory access. If the ECC check is correct or correctable for the data in this attempt, then at block 206 ECC circuitry 122 attempts another access of the page using a non-TEE configuration metadata and generates an ECC check for this attempted memory access. If the ECC check is also correct or correctable by ECC circuitry for this attempt at the data at block 208, then the TEE configuration metadata is ambiguous at block 210; ECC circuitry 122 stores the memory address supplied by the memory scrubber circuitry as an unknown (e.g., undetermined) cacheline address and processing continues at block 222 of FIG. 2B via connector 2B. In an implementation, the unknown cache address may be stored in a register. If the ECC check for the data is not correct at block 208, but was correct at block 204, then ECC circuitry 122 at block 212 corrects the unknown cacheline address to be a memory address accessing memory for a TEE domain (e.g., updates/corrects the TEE configuration metadata for the cacheline as TEE) and processing ends.

If the ECC for the data is not correct at block 204, then at block 214 ECC circuitry 122 attempts another access of the page using a non-TEE configuration metadata and generates an ECC check for the data from this attempted memory access. If the ECC check for the data is also correct for this attempt at block 216, then at block 218 ECC circuitry 122 corrects the unknown cacheline address to be a memory address accessing memory for a non-TEE domain (e.g., updates/corrects with the non-TEE configuration metadata for the cacheline) and processing ends. If the ECC check for the data is not correct at block 216, then an uncorrectable error has been detected and processing ends. In an implementation, the uncorrectable error may be returned. This is because if, after trying both TEE configuration metadata, neither TEE configuration metadata is correct or correctable by ECC circuitry, then an uncorrectable error has occurred. In an implementation, the memory scrubber circuitry 124 may poison the cacheline in memory or update the memory cacheline with a poison pattern indicating the cacheline is uncorrectable.

At block 222 on FIG. 2B, if the attempted memory access (e.g., by the memory address) is to the last cacheline on the page, then at block 224 the ECC circuitry sets the memory address (for the attempted access) to the first cacheline on the page. Otherwise, at block 226 the ECC circuitry sets the memory address to the next cacheline on the page. In either case, at block 228 ECC circuitry 122 determines if all cachelines on the page have been checked. In an implementation, checking includes comparing the current accessed cacheline address with the stored unknown cacheline address (e.g., the cacheline the memory controller is trying to determine the TEE configuration for) and if the cacheline addresses are the same, the memory controller has checked all cacheline addresses for the page.

If so, at block 230 an uncorrectable error has been detected and processing ends (the memory line may be written back with a poison indicator or pattern to indicate it is uncorrectable). This occurs when the ECC circuitry has attempted to access the page using all cachelines of the page and no attempted accesses have been successful, either because all cachelines are uncorrectable for both TEE configuration metadata or all cachelines are ambiguous on which TEE configuration metadata was used. In an implementation, the uncorrectable error may be returned. If all cachelines have not been checked, processing returns to block 202 on FIG. 2A via connector 2A to attempt a memory address using the selected cacheline (e.g., set at either block 224 or block 226) and re-generate the first ECC check. In this way ECC circuitry 122 attempts to access the memory (e.g., testing up to all cachelines on the page) and corrects an unknown cacheline as either TEE or non-TEE, or determines an uncorrectable error has occurred.

When an uncorrectable error is detected for a cacheline due to an ambiguity, the ECC circuitry is unable to resolve whether the cacheline is for a TEE domain or a non-TEE process (because accessing the cacheline results in detectable but uncorrectable errors). In some embodiments, the memory scrubber circuitry 124 does not write back any data to memory 128. Instead, in an implementation, a next load or store request from processor 104 may be used to correct the error when reading the cacheline (since the TEE configuration metadata is part of the memory address for the read request).

If attempts to access both the TEE memory configuration and non-TEE memory configuration with the same cacheline result in uncorrectable errors, then in an implementation memory scrubber circuitry may poison the cacheline in memory.

In an example, if the current cacheline address is CL_ADDR, the address of an adjacent cacheline on the same page is calculated as "CL_ADDR^0x1" (where "^" is the exclusive-OR operation). Other cacheline addresses on the same page as CL_ADDR are within the range [CL_ADDR_0 to CL_ADDR_63], where CL_ADDR_0=(CL_ADDR>>6)<<6, in which ">>" and "<<" are shift right and shift left operations, respectively. CL_ADDR_63 is calculated as CL_ADDR_0+0x3F. The calculations assume a 4K page size and a 64B cacheline size. Determining the physical address may not be possible at intellectual property (IP) block (circuit) placements close to memory 128. It may be necessary to implement the memory scrubber circuitry functionality at a pipeline location where physical page memory addresses are known (for example, where the MKTME/TME-MK circuitry is located (such as processor 104)).

In an implementation, to allow for a correction, an indicator (e.g., a wire) in memory controller 120 may be used to indicate to ECC circuitry 122 which TEE configuration metadata is definitive. This can be used by the memory scrubber circuitry 124 to override the dual TEE configuration metadata correction DUE by providing the correct TEE configuration metadata to the ECC circuitry 122. This will result in a correction of the cacheline using the specified TEE configuration metadata.

In some implementations, memory 128 may include Adaptive Double DRAM Device Correction (ADDDC) circuitry. SDDC errors can make additional errors uncorrectable. Memory cachelines may be split across unaffected memory devices to assure that error correction can continue to be performed. In this case, the ECC bits need to be recalculated using additional data from additional memory lines or ranks. In this way, ECC is maintained at the price of some performance impact (as additional memory accesses are required to access the additional data). During ECC recalculation, the SDDC cacheline will be evaluated for TEE configuration metadata collisions. If a collision is observed, additional lines from the same physical page are queried. If a cacheline is found without a collision, that TEE configuration metadata can be assumed for cachelines with the same configuration on the same page. All cachelines in a page may be queried to determine if the TEE configuration metadata is correct. ADDDC pairing should likewise include only cachelines that share the same page because the TEE configuration metadata must be the same for both paired cachelines on the same page. The correct TEE configuration metadata may then be chosen from the TEE configuration metadata of the non-SDDC cacheline during pairing.

When setting a TEE configuration metadata for a page, software running in TEE 106 stores to one cacheline at a time. It is possible that memory scrubber circuitry 124 is accessing a page at the same time software is changing the TEE configuration metadata of the page. To solve such ambiguities due to race conditions, it may be beneficial to verify the TEE configuration metadata across more than two cachelines or require TEE domains to initialize pages in a different access pattern using direct memory writes 64 bytes at a time in an order that is complementary to the memory scrubber circuitry 124 or ADDDC circuitry.

There may be a race condition when a page is being reassigned (from a TEE or to a TEE), such that not all cachelines on the page are updated when an SDDC error occurs. Therefore, before committing a page as initialized, it may be necessary for software to initialize the page configuration (TEE or non-TEE), and then check for memory errors. If memory errors are observed, the page is re-initialized. An initialized page may be re-read from memory to test for errors assuming it was initialized with an uncached memory operation that does not also write to cache (thus assuring all loads/reads come from memory 128). Assuming the memory scrubber circuitry assures that the TEE configuration metadata of an entire page is set the same, only the first line of a page needs to be tested after a direct write (e.g., MOVDIR64 instruction) initialization that starts with the first line of a page and ends with the last line of a page assuming the memory scrubber circuitry accesses memory in the same order.

In an implementation, race conditions may be addressed with software reconfiguration of a TEE page during an SDDC to check multiple cachelines in the reverse order of the software initialization (e.g., by a TEE domain). Two even or odd cachelines in agreement about the TEE configuration metadata of the page will set the TEE configuration for the remaining cachelines of the page assuming the TEE domain software and memory scrubber circuitry 124 access memory in opposite directions.

Figure 3:
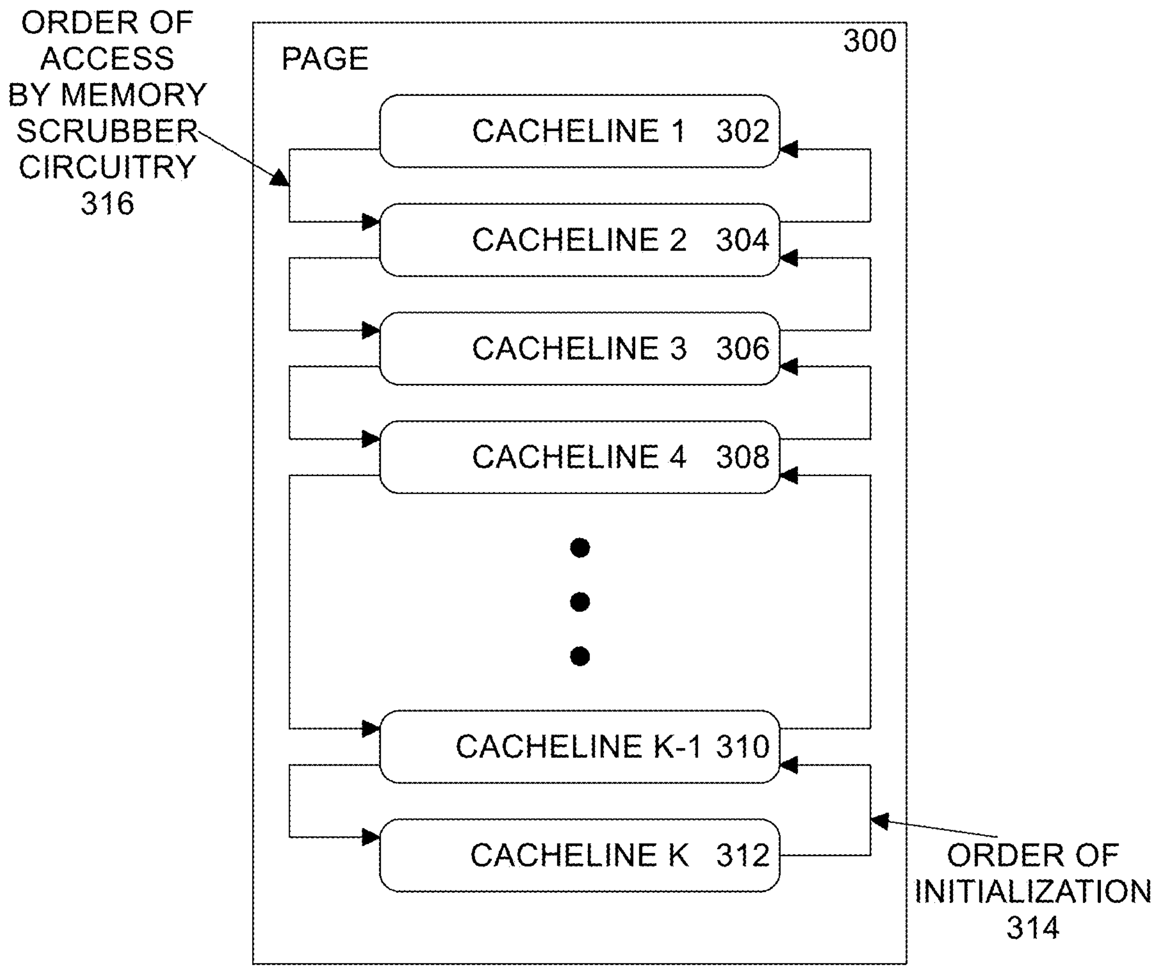
FIG. 3 illustrates an order of memory access during memory initialization and an order of memory access during memory scrubber circuitry processing in an implementation.

FIG. 3 illustrates an order of memory access during memory initialization and an order of memory access during memory scrubber circuitry processing in an implementation. For example, assume software in a TEE domain initializes page 300 in a first order 314 of cacheline K 312, cacheline K−1 310, . . . cacheline 4 308, cacheline 3 306, cacheline 2 304, cacheline 1 302, where K is a natural number. Memory scrubber circuitry 124 accesses page 300 in a second order 316 of cacheline 1 302, cacheline 2 304, cacheline 3 306, cacheline 4 308, . . . cacheline K−1 310, cacheline K 312.

In this way, if there is a TEE configuration collision error detected on cacheline 1 302, and cacheline 2 304 is from a different rank or dual-inline memory module (DIMM) of memory 128, then the memory scrubber circuitry 124 will check cacheline 4 308 for agreement before choosing the TEE configuration metadata for the cacheline 1 302. If software in a TEE domain was changing the cacheline 4 308 before arriving at the cacheline 2 304 address, the two accesses will not be in agreement on TEE configuration metadata, but access to cacheline 4 308 takes precedence because that is the access order for the TEE domain software initializing the page.

In another implementation, a dual or multi-cacheline instruction is defined, to be executed by processor 104, for initializing memory 128 in a single atomic operation such that two (or more) adjacent cachelines will always agree on the TEE configuration metadata as they are initialized as a single transaction. The memory scrubber circuitry 124 will monitor for transactional memory writes such that both cachelines write to memory before the memory scrubber circuitry attempts to access the same memory location.

When there is a full memory device failure, the failure will likely affect all memory associated with a single DIMM at the erroneous device location. The SDDC pattern can thus be further constrained by assuming the failed device location and only accepting single TEE configuration metadata corrections for the failed device location. By combining multiple DIMMs with pairing, where adjacent memory cachelines are accessed by even addresses then odd addresses across two paired DIMMs, one DIMM will have all good devices complementing the DIMM with a failed device. This creates another mechanism to check TEE configuration metadata across a page that is split between multiple DIMMs to determine the correct TEE configuration metadata of a page impacted by an SDDC on the page's even or odd cachelines. For example, in a dual DIMM scenario, even address cachelines will be on DIMM 1 and odd address lines will be on DIMM 2.

In an implementation, different keys (e.g., MAGIC ECC secret keys or memory encryption keys) may be utilized for TEE domains and non-TEE processes, diffusing ECC symbols with a block cipher based on different secret keys. This may obviate the need for TEE configuration metadata to distinguish between the two keys. One advantage of using different keys is that one TEE domain cannot induce corruption (e.g., by a row hammer attack on memory 128) and determine its effects on another TEE domain. This may be preferable to a single TEE bit for TEE configuration metadata where row hammering a memory may result in bit flipping via an invalid ECC correction (SDDC).

Figure 4:
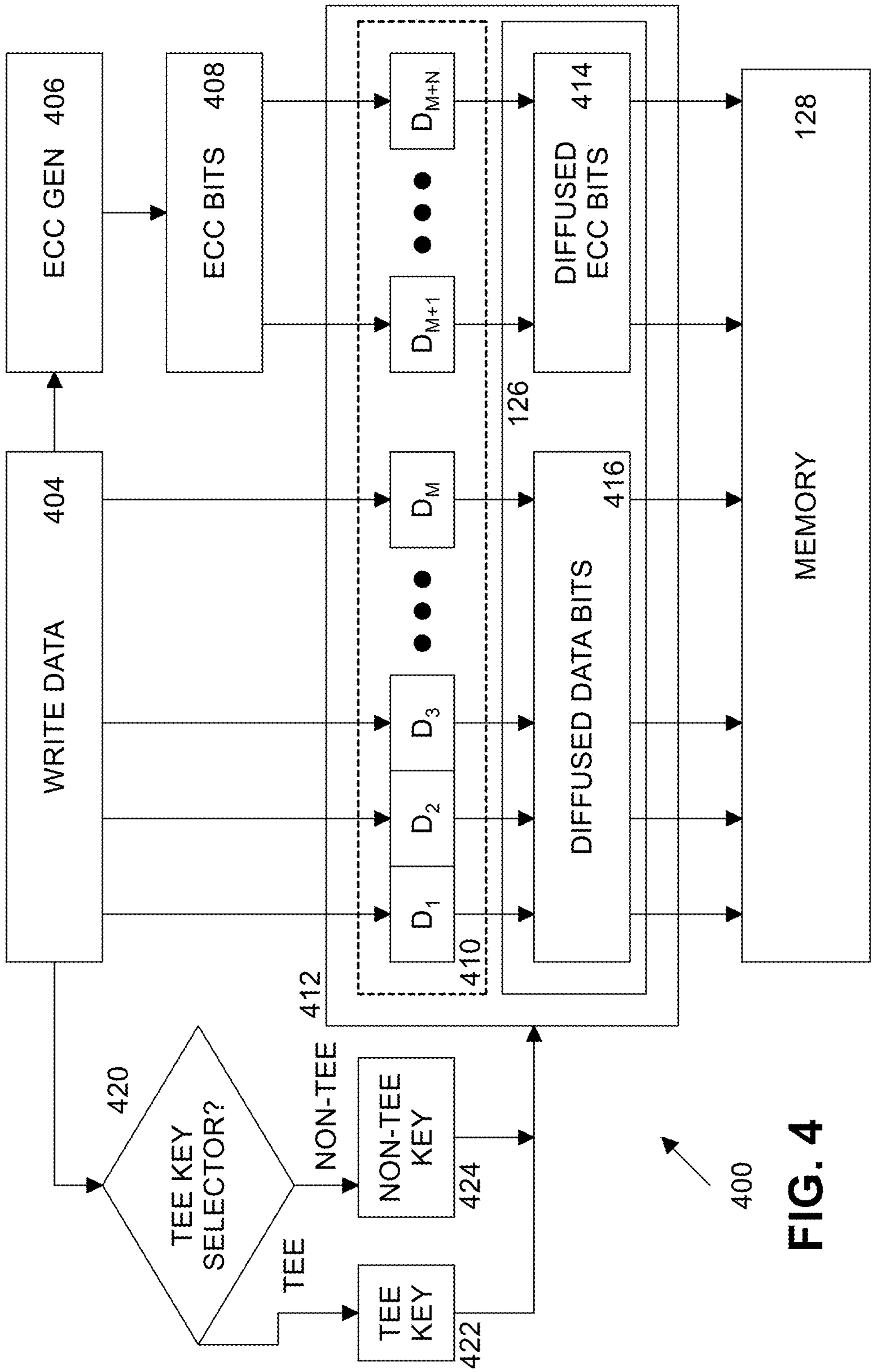
FIG. 4 illustrates selection of a TEE key or a non-TEE key during memory access processing in an implementation.

FIG. 4 illustrates selection of a TEE key or a non-TEE key during memory access processing in an implementation. In an implementation, the ECC is computed on write data 404 using ECC GEN circuitry 406 to generate ECC bits 408, followed by write diffusion layer circuitry 412 comprising diffusion function circuits 410 to produce diffused data bits 416 and diffused ECC bits 414 from write data 404 and ECC bits 408, respectively. The diffused data bits 416 and diffused ECC bits 414 are then stored in a memory 128 (e.g., a DRAM). ECC circuitry 122 may determine a TEE key selector from the TEE configuration metadata at block 420. If a TEE key is indicated, then TEE key 422 from TEE configuration metadata is used by diffusion function circuits 410. If a non-TEE key is indicated, then non-TEE key 424 is used by diffusion function circuits 410.

In an implementation, it may be necessary to check both key configurations in the case of a full SDDC scenario (e.g., multiple errors across a single memory device) being detected. If ECC circuitry 122 determines the cacheline is correct or correctable by ECC for both keys, then an ambiguous state exists that may be resolved via the operations described in FIGS. 2A and 2B where TEE accesses are attempted using the TEE key and non-TEE accesses are attempted using a different key (or, in some implementations, without a key) and multiple cachelines on the same page are accessed until the ambiguous line's TEE configuration metadata can be resolved.

TEE configuration metadata is one example of metadata that may be unambiguously encoded in this way. Any coarser grain memory configuration, permission, key, or policy may be similarly encoded in accordance with this mechanism, resolving ambiguities by checking multiple adjacent lines of memory with alternative configurations to determine the correct configuration to be used for error correction.

In an implementation, the number of possible memory access configurations (e.g., TEE or non-TEE) may be expanded to three or more (e.g., multiple possible configurations). In this implementation, the operations of FIGS. 2A and 2B may be performed but expanded to test all possible configurations and if only one is correct/correctable by ECC, then using that configuration. If multiple configurations are correct/correctable by ECC, then any ambiguity may be resolved by checking other cachelines on the same page (or other such grouping) that should be configured similarly until the ambiguity is resolved.

Figure 5:
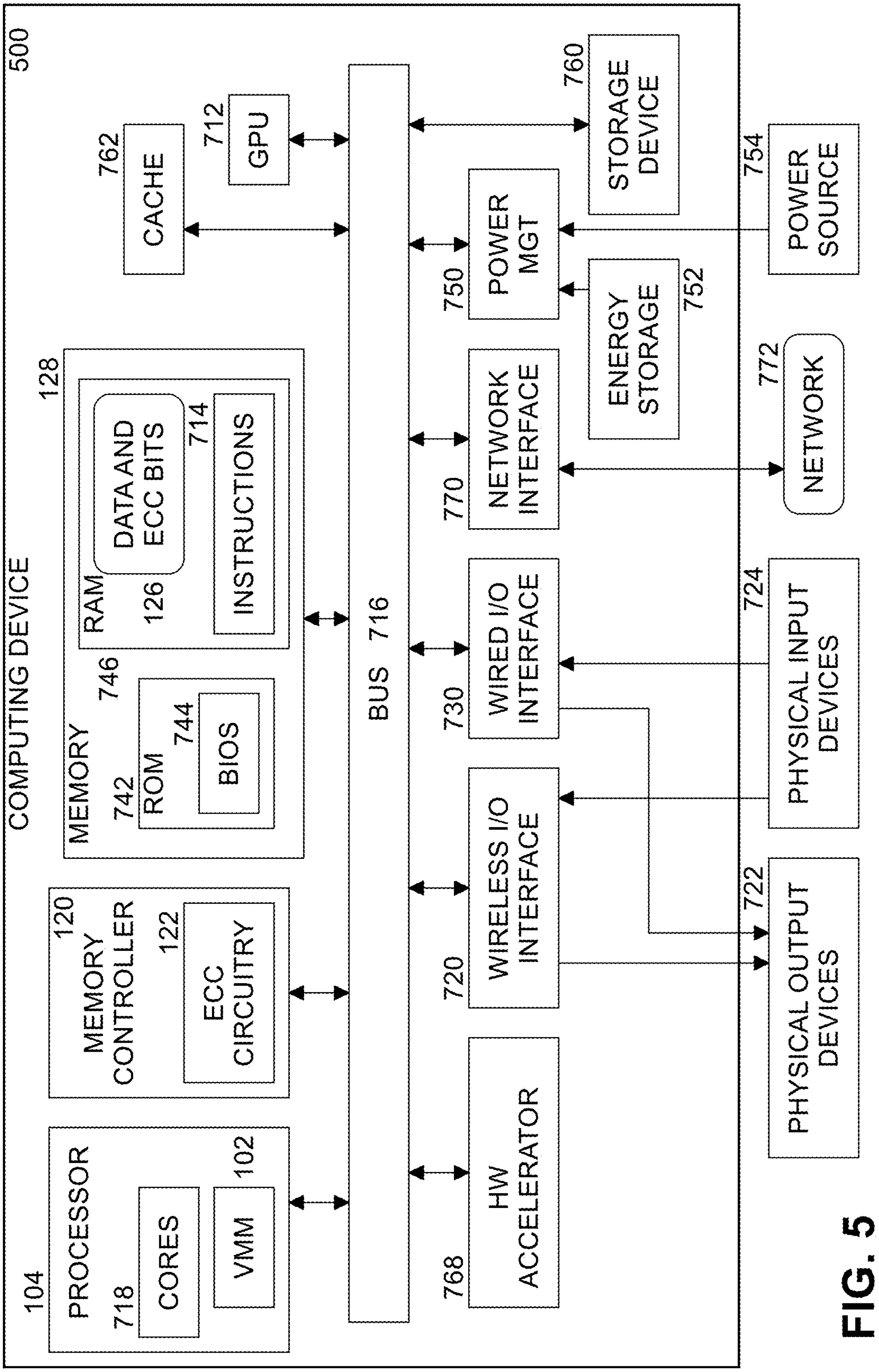
FIG. 5 is a schematic diagram of an illustrative electronic computing device to perform a method of memory controller processing according to an implementation.

FIG. 5 is a schematic diagram of an illustrative electronic computing device 500 to perform a method of memory controller processing according to an implementation. In some embodiments, the computing device 500 includes at least one processor 104 including one or more processor cores 718 and memory controller 120 to perform security ECC processing, as described in FIGS. 1-4. In some embodiments, the computing device 500 includes one or more hardware accelerators 768.

In some embodiments, the computing device is to implement security ECC processing, as described in FIGS. 1-4.

The computing device 500 may additionally include one or more of the following: cache 762, a graphical processing unit (GPU) (e.g., graphics processor circuitry 712) (which may be the hardware accelerator in some implementations), a wireless input/output (I/O) interface 720, a wired I/O interface 730, memory circuitry 740, power management circuitry 750, non-transitory storage device 760, and a network interface 770 for connection to a network 772. The following discussion provides a brief, general description of the components forming the illustrative computing device 500. Example, non-limiting computing devices 500 may include a desktop computing device, blade server device, workstation, or similar device or system.

In embodiments, the processor cores 718 are capable of executing machine-readable instruction sets 714, reading data and/or instruction sets 714 from one or more storage devices 760 and writing data to the one or more storage devices 760. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. For example, machine-readable instruction sets 714 may include instructions to implement security ECC processing, as provided in FIGS. 1-4.

The processor cores 718 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 500 includes a bus 716 or similar communications link that communicably couples and facilitates the exchange of information and/or data between various system components including the processor cores 718, the cache 762, the graphics processor circuitry 712, one or more wireless I/O interfaces 720, one or more wired I/O interfaces 730, one or more storage devices 760, and/or one or more network interfaces 770. The computing device 500 may be referred to in the singular herein, but this is not intended to limit the embodiments to a single computing device 500, since in certain embodiments, there may be more than one computing device 500 that incorporates, includes, or contains any number of communicably coupled, collocated, or remote networked circuits or devices.

The processor cores 718 may include any number, type, or combination of currently available or future developed devices capable of executing machine-readable instruction sets.

The processor cores 718 may include (or be coupled to) but are not limited to any current or future developed single- or multi-core processor or microprocessor, such as: one or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 5 are of conventional design. Consequently, such blocks need not be described in further detail herein, as they will be understood by those skilled in the relevant art. The bus 716 that interconnects at least some of the components of the computing device 500 may employ any currently available or future developed serial or parallel bus structures or architectures.

The memory 128 may include read-only memory ("ROM") 742 and random-access memory ("RAM") 746. Memory 128 may be managed by memory controller 120, which may include ECC circuitry 122. Data and ECC bits 126 may be written to and read from memory 128 by processor 104 using memory controller 120. A portion of the ROM 742 may be used to store or otherwise retain a basic input/output system ("BIOS") 744. The BIOS 744 provides basic functionality to the computing device 500, for example by causing the processor cores 718 to load and/or execute one or more machine-readable instruction sets 714. In embodiments, at least some of the one or more machine-readable instruction sets 714 cause at least a portion of the processor cores 718 to provide, create, produce, transition, and/or function as a dedicated, specific, and particular machine, for example a word processing machine, a digital image acquisition machine, a media playing machine, a gaming system, a communications device, a smartphone, a neural network, a machine learning model, or similar devices.

The computing device 500 may include at least one wireless input/output (I/O) interface 720. The at least one wireless I/O interface 720 may be communicably coupled to one or more physical output devices 722 (tactile devices, video displays, audio output devices, hardcopy output devices, etc.). The at least one wireless I/O interface 720 may communicably couple to one or more physical input devices 724 (pointing devices, touchscreens, keyboards, tactile devices, etc.). The at least one wireless I/O interface 720 may include any currently available or future developed wireless I/O interface. Example wireless I/O interfaces include, but are not limited to: BLUETOOTH®, near field communication (NFC), and similar.

The computing device 500 may include one or more wired input/output (I/O) interfaces 730. The at least one wired I/O interface 730 may be communicably coupled to one or more physical output devices 722 (tactile devices, video displays, audio output devices, hardcopy output devices, etc.). The at least one wired I/O interface 730 may be communicably coupled to one or more physical input devices 724 (pointing devices, touchscreens, keyboards, tactile devices, etc.). The wired I/O interface 730 may include any currently available or future developed I/O interface. Example wired I/O interfaces include but are not limited to: universal serial bus (USB), IEEE 1394 ("FireWire"), and similar.

The computing device 500 may include one or more communicably coupled, non-transitory, data storage devices 760. The data storage devices 760 may include one or more hard disk drives (HDDs) and/or one or more solid-state storage devices (SSDs). The one or more data storage devices 760 may include any current or future developed storage appliances, network storage devices, and/or systems. Non-limiting examples of such data storage devices 760 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 760 may include one or more removable storage devices, such as one or more flash drives, flash memories, flash storage units, or similar appliances or devices capable of communicable coupling to and decoupling from the computing device 500.

The one or more data storage devices 760 may include interfaces or controllers (not shown) communicatively coupling the respective storage device or system to the bus 716. The one or more data storage devices 760 may store, retain, or otherwise contain machine-readable instruction sets, data structures, program modules, data stores, databases, logical structures, and/or other data useful to the processor cores 718 and/or graphics processor circuitry 712 and/or one or more applications executed on or by the processor cores 718 and/or graphics processor circuitry 712. In some instances, one or more data storage devices 760 may be communicably coupled to the processor cores 718, for example via the bus 716 or via one or more wired communications interfaces 730 (e.g., Universal Serial Bus or USB); one or more wireless communications interfaces 720 (e.g., Bluetooth®, Near Field Communication or NFC); and/or one or more network interfaces 770 (IEEE 802.3 or Ethernet, IEEE 802.11, or Wi-Fi®, etc.).

Processor-readable instruction sets 714 and other programs, applications, logic sets, and/or modules may be stored in whole or in part in the memory 128. Such instruction sets 714 may be transferred, in whole or in part, from the one or more data storage devices 760. The instruction sets 714 may be loaded, stored, or otherwise retained in memory 128, in whole or in part, during execution by the processor cores 718 and/or graphics processor circuitry 712.

The computing device 500 may include power management circuitry 750 that controls one or more operational aspects of the energy storage device 752. In embodiments, the energy storage device 752 may include one or more primary (i.e., non-rechargeable) or secondary (i.e., rechargeable) batteries or similar energy storage devices. In embodiments, the energy storage device 752 may include one or more supercapacitors or ultracapacitors. In embodiments, the power management circuitry 750 may alter, adjust, or control the flow of energy from an external power source 754 to the energy storage device 752 and/or to the computing device 500. The power source 754 may include, but is not limited to, a solar power system, a commercial electric grid, a portable generator, an external energy storage device, or any combination thereof.

For convenience, the processor cores 718, the graphics processor circuitry 712, the wireless I/O interface 720, the wired I/O interface 730, the storage device 760, and the network interface 770 are illustrated as communicatively coupled to each other via the bus 716, thereby providing connectivity between the above-described components. In alternative embodiments, the above-described components may be communicatively coupled in a different manner than illustrated in FIG. 5. For example, one or more of the above-described components may be directly coupled to other components, or may be coupled to each other, via one or more intermediary components (not shown). In another example, one or more of the above-described components may be integrated into the processor cores 718 and/or the graphics processor circuitry 712. In some embodiments, all or a portion of the bus 716 may be omitted and the components are coupled directly to each other using suitable wired or wireless connections.

Flowcharts representative of example hardware logic, machine readable instructions, hardware implemented state machines, and/or any combination thereof for implementing computing device 500, for example, are shown in FIGS. 2A and 2B. The machine-readable instructions may be one or more executable programs or portion(s) of an executable program for execution by a computer processor such as the processor 104 shown in the example computing device 500 discussed above in connection with FIG. 5. The program may be embodied in software stored on a non-transitory computer readable storage medium such as a CD-ROM, a floppy disk, a hard drive, a DVD, a Blu-ray disk, or a memory associated with the processor 104, but the entire program and/or parts thereof could alternatively be executed by a device other than the processor 104 and/or embodied in firmware or dedicated hardware. Further, although the example program is described with reference to the flowchart illustrated in FIGS. 2A and 2B, many other methods of implementing the example computing devices 500 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein.

In another example, the machine-readable instructions may be stored in a state in which they may be read by a computer, but require addition of a library (e.g., a dynamic link library (DLL)), a software development kit (SDK), an application programming interface (API), etc., in order to execute the instructions on a particular computing device or other device. In another example, the machine-readable instructions may be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example process of FIGS. 2A and 2B may be implemented using executable instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

“Including” and “comprising” (and all forms and tenses thereof) are used herein to be open ended terms. Thus, whenever a claim employs any form of “include” or “comprise” (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase “at least” is used as the transition term in, for example, a preamble of a claim, it is open-ended in the same manner as the terms “comprising” and “including” are open ended.

The term “and/or” when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase “at least one of A and B” is intended to refer to implementations including any of (1) at least one A, (2) at least one B, and (3) at least one A and at least one B. Similarly, as used herein in the context of describing structures, components, items, objects and/or things, the phrase “at least one of A or B” is intended to refer to implementations including any of (1) at least one A, (2) at least one B, and (3) at least one A and at least one B. As used herein in the context of describing the performance or execution of processes, instructions, actions, activities and/or steps, the phrase “at least one of A and B”

is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

EXAMPLES

Example 1 is an apparatus including a memory to store a plurality of pages, a page of the plurality of pages configured as one of a trusted execution environment (TEE) configuration and a non-TEE configuration; and a memory controller coupled to the memory, the memory controller to attempt to access the page using a memory address and the TEE configuration and generate a first error correcting code (ECC); and when data for the first ECC is at least one of correct and correctable by ECC for the attempt to access the page using the TEE configuration, attempt to access the page using the memory address and the non-TEE configuration and generate a second ECC, and when data for the second ECC is at least one of correct and correctable by ECC for the attempt to access the page using the non-TEE configuration, store the memory address as an unknown cacheline address, and when data for the second ECC is not correct or correctable by ECC for the attempt to access the page using the non-TEE configuration, correct the memory address to be a TEE memory address.

In Example 2, the subject matter of Example 1 may optionally include the memory controller to, when data for the first ECC is not correct or correctable by ECC, attempt to access the page using the memory address and the non-TEE configuration and generate a third ECC, and when data for the third ECC is at least one of correct and correctable by ECC, correct the memory address to be a non-TEE memory address. In Example 3, the subject matter of Example 2 may optionally include the memory controller to, when the third ECC is not correct or correctable by ECC, detect an uncorrectable error. In Example 4, the subject matter of Example 1 may optionally include the memory controller to, when data for the second ECC is at least one of correct and correctable by ECC for the attempt to access the page using the non-TEE configuration, set the memory address to a first cacheline address on the page when the memory address is to a last cacheline of the page and set the memory address to a next cacheline address on the page when the memory address is not to the last cacheline of the page. In Example 5, the subject matter of Example 4 may optionally include the memory controller to, when all cachelines are checked on the page, detect an uncorrectable error.

In Example 6, the subject matter of Example 4 may optionally include the memory controller to, when not all cachelines are checked on the page, attempt to access the page using the memory address and the TEE configuration and re-generate the first ECC. In Example 7, the subject matter of Example 1 may optionally include wherein the memory controller comprises memory scrubber circuitry to attempt to access the page using the memory address; and ECC circuitry, coupled to the memory scrubber circuitry, to generate the first ECC and when data for the first ECC is at least one of correct and correctable by ECC for the attempt to access the page using the TEE configuration, attempt to access the page using the memory address and the non-TEE configuration and generate the second ECC, and when data for the second ECC is at least one of correct and correctable by ECC for the attempt to access the page using the non-TEE configuration, store the memory address as the unknown cacheline address, and when data for the second ECC is not correct or correctable by ECC for the attempt to access the page using the non-TEE configuration, correct the memory address to be the TEE memory address.

In Example 8, the subject matter of Example 1 may optionally include wherein the TEE configuration is indicated by a TEE bit in the memory address. In Example 9, the subject matter of Example 1 may optionally include wherein the TEE configuration is indicated by at least one of a plurality of bits in the memory address and a plurality of metadata bits on a cacheline. In Example 10, the subject matter of Example 9 may optionally include wherein the plurality of bits in the memory address and the plurality of metadata bits on the cacheline comprise a Galois integrity and correction (MAGIC) ECC secret key. In Example 11, the subject matter of Example 10 may optionally include wherein the memory controller uses a first MAGIC ECC secret key to access a first page having the TEE configuration and a second MAGIC ECC secret key to access a second page having the non-TEE configuration. In Example 12, the subject matter of Example 1 may optionally include wherein all cachelines of the page have the TEE configuration or all cachelines of the page have the non-TEE configuration.

Example 13 is a method including attempting to access a page of a memory, the page configured as one of a trusted execution environment (TEE) configuration and a non-TEE configuration, using a memory address and the TEE configuration and generating a first error correcting code (ECC); and when data for the first ECC is at least one of correct and correctable by ECC for the attempt to access the page using the TEE configuration, attempting to access the page using the memory address and the non-TEE configuration and generating a second ECC, and when data for the second ECC is at least one of correct and correctable by ECC for the attempt to access the page using the non-TEE configuration, storing the memory address as an unknown cacheline address, and when data for the second ECC is not correct or correctable by ECC for the attempt to access the page using the non-TEE configuration, correcting the memory address to be a TEE memory address.

In Example 14, the subject matter of Example 13 may optionally include, when data for the first ECC is not correct or correctable by ECC, attempting to access the page using the memory address and the non-TEE configuration and generating a third ECC, and when data for the third ECC is at least one of correct and correctable by ECC, correcting the memory address to be a non-TEE memory address. In Example 15, the subject matter of Example 14 may optionally include, when data for the third ECC is not correct or correctable by ECC, detecting an uncorrectable error. In Example 16, the subject matter of Example 13 may optionally include, when data for the second ECC is at least one of correct and correctable by ECC for the attempt to access the page using the non-TEE configuration, setting the memory address to a first cacheline address on the page when the memory address is to a last cacheline of the page and setting the memory address to a next cacheline address on the page when the memory address is not to the last cacheline of the page. In Example 17, the subject matter of Example 16 may optionally include, when all cachelines are checked on the page, detecting an uncorrectable error. In Example 18, the subject matter of Example 16 may optionally include, when not all cachelines are checked on the page, attempting to access the page using the memory address and the TEE configuration and re-generate the first ECC.

Example 19 is at least one machine-readable storage medium comprising instructions which, when executed by at least one processing device, cause the at least one processing device to attempt to access a page of a memory, the page configured as one of a trusted execution environment (TEE) configuration and a non-TEE configuration, using a memory address and the TEE configuration and generate a first error correcting code (ECC); and when data for the first ECC is at least one of correct and correctable by ECC for the attempt to access the page using the TEE configuration, attempt to access the page using the memory address and the non-TEE configuration and generate a second ECC, and when data for the second ECC is at least one of correct and correctable by ECC for the attempt to access the page using the non-TEE configuration, store the memory address as an unknown cacheline address, and when data for the second ECC is not correct or correctable by ECC for the attempt to access the page using the non-TEE configuration, correct the memory address to be a TEE memory address.

In Example 20, the subject matter of Example 19 may optionally include instructions which, when executed by the at least one processing device, cause the at least one processing device to, when data for the first ECC is not correct or correctable by ECC, attempt to access the page using the memory address and the non-TEE configuration and generate a third ECC, and when data for the third ECC is at least one of correct and correctable by ECC, correct the memory address to be a non-TEE memory address. In Example 21, the subject matter of Example 20 may optionally include instructions which, when executed by the at least one processing device, cause the at least one processing device to, when data for the third ECC is not correct or correctable by ECC, detect an uncorrectable error. In Example 22, the subject matter of Example 19 may optionally include instructions which, when executed by the at least one processing device, cause the at least one processing device to, when data for the second ECC is at least one of correct and correctable by ECC for the attempt to access the page using the non-TEE configuration, set the memory address to a first cacheline address on the page when the memory address is to a last cacheline of the page and set the memory address to a next cacheline address on the page when the memory address is not to the last cacheline of the page.

In Example 23, the subject matter of Example 22 may optionally include instructions which, when executed by the at least one processing device, cause the at least one processing device to, when all cachelines are checked on the page, detect an uncorrectable error. In Example 24, the subject matter of Example 22 may optionally include instructions which, when executed by the at least one processing device, cause the at least one processing device to, when not all cachelines are checked on the page, attempt to access the page using the memory address and the TEE configuration and re-generate the first ECC.

Example 24 is an apparatus operative to perform the method of any one of Examples 13 to 18. Example 25 is an apparatus that includes means for performing the method of any one of Examples 13 to 18. Example 26 is an apparatus that includes any combination of modules and/or units and/or logic and/or circuitry and/or means operative to perform the method of any one of Examples 13 to 18. Example 27 is an optionally non-transitory and/or tangible machine-readable medium, which optionally stores or otherwise provides instructions that if and/or when executed by a computer system or other machine are operative to cause the machine to perform the method of any one of Examples 13 to 18.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. An apparatus comprising:

a memory to store a plurality of pages, a page of the plurality of pages configured as one of a trusted execution environment (TEE) configuration and a non-TEE configuration; and a memory controller coupled to the memory, the memory controller configured to:

access a memory address for the page on behalf of a requestor configured to perform autonomous single data device correction (SDDC) for the page;

determine whether the page is configured to the TEE configuration or the non-TEE configuration on behalf of the requestor via one or more error correcting code (ECC) checks performed on data fetched from the page; and validate metadata associated with the page, the metadata to indicate whether the page is configured with the TEE configuration or the non-TEE configuration.

2. The apparatus of claim 1, wherein the memory controller is configured to:

attempt a first access to the page using the memory address and the TEE configuration;

perform a first ECC check on first data fetched from the page in association with the first access;

in response to a determination that the first ECC check indicates that the first data is at least one of correct and correctable by ECC, attempt a second access to the page using the memory address and the non-TEE configuration;

perform a second ECC check on second data fetched from the page in association with the second access; and in response to a determination that the second ECC check indicates that the second data is not correct or correctable by ECC, verify that the metadata indicates the TEE configuration.

3. The apparatus of claim 1, wherein the memory controller comprises memory scrubber circuitry configured to perform the autonomous SDDC and additionally comprises ECC circuitry coupled with the memory scrubber circuitry.

4. The apparatus of claim 1, wherein the TEE configuration is indicated by a TEE bit in the memory address or at least one of a plurality of bits in the memory address and a plurality of metadata bits on a cacheline.

5. The apparatus of claim 2, wherein the memory controller is configured to:

in response to a determination that the first ECC check indicates that the first data is not correct or correctable by ECC, attempt a third access to the page using the memory address and the non-TEE configuration;

perform a third ECC check on third data fetched from the page in association with the third access; and in response to a determination that the third ECC check indicates that the third data is at least one of correct and correctable by ECC, verify that the metadata indicates the non-TEE configuration.

6. The apparatus of claim 5, wherein the memory controller is configured to:

in response to a determination that the third ECC check indicates that the third data is not correct or correctable by ECC, detect an uncorrectable error.

7. The apparatus of claim 5, wherein the memory controller is configured to:

in response to a determination that the second ECC check indicates that the second data is at least one of correct and correctable by ECC, store the memory address as an unknown cacheline address, set the memory address to a first cacheline address on the page when the memory address is to a last cacheline of the page and set the memory address to a next cacheline address on the page when the memory address is not to the last cacheline of the page.

8. The apparatus of claim 6, wherein the memory controller is configured to, when not all cachelines are checked on the page, attempt to access the page via the memory address and the TEE configuration and re-generate a first ECC for the first ECC check, and wherein all cachelines of the page have the TEE configuration or all cachelines of the page have the non-TEE configuration.

9. The apparatus of claim 8, wherein the memory controller is configured to, when all cachelines are checked on the page, detect an uncorrectable error.

10. The apparatus of claim 4, wherein the plurality of bits in the memory address and the plurality of metadata bits on the cacheline comprise a Galois integrity and correction (MAGIC) ECC secret key, the memory controller is to use a first MAGIC ECC secret key to access a first page having the TEE configuration and a second MAGIC ECC secret key to access a second page having the non-TEE configuration.

11. A method comprising:

attempting to access a page of a memory, the page configured as one of a trusted execution environment (TEE) configuration and a non-TEE configuration, using a memory address and the TEE configuration and generating a first error correcting code (ECC);

determining whether the page is configured to the TEE configuration or the non-TEE configuration via one or more error correcting code (ECC) checks performed on data fetched from the page; and validating metadata associated with the page, the metadata to indicate whether the page is configured with the TEE configuration or the non-TEE configuration.

12. The method of claim 11, comprising:

attempting a first access to the page using the memory address and the TEE configuration;

performing a first ECC check on first data fetched from the page in association with the first access;

in response to a determination that the first ECC check indicates that the first data is at least one of correct and correctable by ECC, attempting a second access to the page using the memory address and the non-TEE configuration;

performing a second ECC check on second data fetched from the page in association with the second access; and in response to a determination that the second ECC check indicates that the second data is not correct or correctable by ECC, verifying that the metadata indicates the TEE configuration.

13. The method of claim 12, comprising:

in response to a determination that the first ECC check indicates that the first data is not correct or correctable by ECC, attempting a third access to the page using the memory address and the non-TEE configuration;

performing a third ECC check on third data fetched from the page in association with the third access; and in response to a determination that the third ECC check indicates that the third data is at least one of correct and correctable by ECC, verifying that the metadata indicates the non-TEE configuration.

14. The method of claim 13, comprising:

in response to a determination that the third ECC check indicates that the third data is not correct or correctable by ECC, detect an uncorrectable error.

15. The method of claim 13, comprising:

in response to a determination that the second ECC check indicates that the second data is at least one of correct and correctable by ECC, storing the memory address as an unknown cacheline address, setting the memory address to a first cacheline address on the page when the memory address is to a last cacheline of the page and setting the memory address to a next cacheline address on the page when the memory address is not to the last cacheline of the page;

when not all cachelines are checked on the page:

attempting to access the page via the memory address and the TEE configuration; and re-generating a first ECC for the first ECC check, wherein all cachelines of the page have the TEE configuration or all cachelines of the page have the non-TEE configuration; and when all cachelines are checked on the page, detecting an uncorrectable error.

16. A system comprising:

a memory to store a plurality of pages, a page of the plurality of pages configured as one of a trusted execution environment (TEE) configuration and a non-TEE configuration; and a memory controller coupled to the memory, the memory controller comprising memory scrubber circuitry configured to perform autonomous single data device correction (SDDC) and error correcting code (ECC) circuitry coupled to the memory scrubber circuitry, the memory controller configured to:

access a memory address for the page on behalf of the memory scrubber circuitry;

determine whether the page is configured to the TEE configuration or the non-TEE configuration on behalf of the memory scrubber circuitry via one or more error correcting code (ECC) checks performed on data fetched from the page; and validate metadata associated with the page, the metadata to indicate whether the page is configured with the TEE configuration or the non-TEE configuration.

17. The system of claim 16, wherein the memory controller is configured to:

attempt a first access to the page using the memory address and the TEE configuration;

perform a first ECC check on first data fetched from the page in association with the first access;

in response to a determination that the first ECC check indicates that the first data is at least one of correct and correctable by ECC, attempt a second access to the page using the memory address and the non-TEE configuration;

perform a second ECC check on second data fetched from the page in association with the second access; and in response to a determination that the second ECC check indicates that the second data is not correct or correctable by ECC, verify that the metadata indicates the TEE configuration.

18. The system of claim 17, wherein the memory controller is configured to:

in response to a determination that the first ECC check indicates that the first data is not correct or correctable by ECC, attempt a third access to the page using the memory address and the non-TEE configuration;

perform a third ECC check on third data fetched from the page in association with the third access; and in response to a determination that the third ECC check indicates that the third data is at least one of correct and correctable by ECC, verify that the metadata indicates the non-TEE configuration.

19. The system of claim 18, wherein the memory controller is configured to:

in response to a determination that the third ECC check indicates that the third data is not correct or correctable by ECC, detect an uncorrectable error.

20. The system of claim 18, wherein the memory controller is configured to:

in response to a determination that the second ECC check indicates that the second data is at least one of correct and correctable by ECC, store the memory address as an unknown cacheline address, set the memory address to a first cacheline address on the page when the memory address is to a last cacheline of the page and set the memory address to a next cacheline address on the page when the memory address is not to the last cacheline of the page;

when not all cachelines are checked on the page, attempt to access the page via the memory address and the TEE configuration and re-generate a first ECC for the first ECC check, wherein all cachelines of the page have the TEE configuration or all cachelines of the page have the non-TEE configuration; and when all cachelines are checked on the page, detect an uncorrectable error.

* * * * *